Patented Dec. 22, 1953

2,663,426

UNITED STATES PATENT OFFICE 2,663,426

PROCESS FOR IMPROVING ALCOHOL QUALITY

Samuel W. Wilson and Elaine T. Delaune, Baton Rouge, La., assignors to Standard Oil Development Company, a corporation of Delaware No Drawing. Application June 13, 1950, Serial No. 167,916

9 Claims. (Cl. 210—122)

This invention relates to the purification of alcohols and aqueous solutions thereof and particularly to the removal therefrom of malodorous impurities.

It is well known that the substantially water-soluble alcohols containing 1 to 5 carbon atoms per molecule and particularly those prepared by the acid catalyzed hydration of mono-olefins are often contaminated with materials which give rise to distinct unpleasant odors which render the final product unsaleable or at least limit its marketability. The above is especially true of those alcohols prepared by the sulfuric acid-catalyzed hydration of olefins which process is presently in commercial operation in the preparation of ethanol and isopropanol from ethylene and propylene respectively.

It has now been found that alcohol contaminated by malodorous compounds is deodorized by intimately contacting the alcohol or its aqueous solution with finely divided sand. River sand, blasting sand, gravel such as pea gravel and Ottawa sand, etc., are particularly effective. The sand employed is preferably one of not finer than 30 mesh particle size. Particle sizes above 30 mesh are operable but are not as satisfactory. Particle sizes of 4–20 mesh are preferred, although coarser material may be used. The sand requires no preliminary treatment prior to its use. Although the sands named have been found to be effective in removing malodorous materials from alcohols, other solid adsorbents of a similar nature such as silica gel, silicic acid, diatomaceous silica, and asbestos produce no improvement whatsoever in the quality of the alcohol.

The odors associated with the alcohols, especially those prepared by the sulfuric acid-catalyzed hydration of mono-olefins are of two distinct types. The first has been called in the trade "recycle odor." This odor is usually a light fugitive odor associated with low-boiling sulfur compounds such as mercaptans, thio-aldehydes, etc. It is believed that these low boiling sulfur compounds result from the decomposition of a higher boiling parent compound releasing the sulfur compound and in addition a hydrocarbon. Therefore, a hydrocarbon odor is usually always associated with the recycle odor. The second type of odor is termed "butyl odor." This odor is a strong hydrocarbon type odor attributed to the presence of the so-called "high boilers" in the alcohol. The "high boilers" include high-boiling hydrocarbons, high-boiling oxygenated compounds and high-boiling sulfur compounds. It has been found that treatment of the alcohol with sand completely removes the recycle odor and in all cases diminishes the intensity of the butyl odor.

The intimate contact of the odoriferous alcohol with the finely divided sand is carried out with the alcohol either in the liquid phase or in the vapor phase. However, liquid phase treatment is preferred. In conducting the liquid phase contacting two methods are preferably employed, namely, gravity flow of alcohol through a bed of sand, or, upflow passage of the liquid alcohol under pump pressure through the bed of sand. However, it is also possible to mix the alcohol and the sand by agitation and thereafter separate the alcohol from the mixture by passage through a filter press or by settling and decantation. However, this method is not preferred to the passage of the liquid alcohol through a bed of sand which may be more satisfactorily achieved in a continuous manner. If a vapor phase operation is desired the alcohol is heated above its boiling point and the vapors are percolated through a body of the sand.

In case of incomplete removal of the malodorous materials the rate of flow of the liquid through the sand bed may be decreased, the depth or the number of the beds may be increased, and/or passage of the alcohol through the sand may be repeated. The rate of flow through the bed can be fixed at a figure of 0.5 to 50 volumes of alcohol per volume of sand per hour. Generally a rate of 2–20 v./v./hr. is preferred.

The mechanism of the operation whereby the odor is removed is not known. However, it has been established that the sand not only removes the malodorous impurities from the alcohol but also removes reducing substances. Alcohols filtered through a bed of sand show a decided improvement in permanganate time which is a measure of the reducing substances present. "Recycle odor" may possibly be due to the presence of reducing substances. But in addition the butyl odor of the alcohol is also improved and the materials giving rise to butyl odor are not necessarily reducing materials. The permanganate time employed in testing the treated alcohols is the USP method which is a measure of the time in minutes for 0.1 cc. of an 0.1 N solution of $KMnO_4$ at 15° C. to fade from a light pink color. The lower the permanganate time in minutes the poorer the quality of the alcohol indicating the presence therein of reducing materials.

Up to the present time it has not been found necessary to carry out any regeneration of the sand since no harmful effect has been observed by continuous treatment of the alcohol with the sand. During a present period of 40 days continuous operation, approximately 1 million gallons of "off-odor" isopropanol has been deodorized by filtering through a sand bed. The sand is still in perfect operating condition. It has been found further that an alcohol of extremely poor quality with respect to odor can be passed through the bed of sand and a decidedly improved alcohol recovered therefrom. Immediately thereafter a more refined, less malodorous alcohol can be passed through the same bed and it too is upgraded in its quality, particularly its odor. It is contemplated that the sand when necessary can be revivified by simple operation such as water-washing, aeration or mere movement of the sand within the bed. Regeneration is not an important factor because of the cheapness and ready availability of the sand.

It has also been found that the shape and sharpness of the sand particles has no critical effect on the activity of the sand. Blasting sand which is particularly rough and sharp, and Ottawa sand which is extremely smooth and round both give effective results.

It has been found that sand will upgrade any malodorous alcohol whatsoever regardless of the state of its refinement. Even a good alcohol reacts favorably. The alcohol after passage through the sand needs no further treatment and is sent directly to storage. In the tables to follow setting forth the results of experimental work, alcohols are graded as follows:

Grade 1, alcohol with no foreign odor;
Grade 2, an alcohol with a very slight foreign odor;
Grade 3, an alcohol with a moderately noticeable odor;
Grade 4, an alcohol containing appreciable to excessive amounts of odor.

The effectiveness of sands in removing both recycle and butyl odors from alcohols is shown in the following tables. In Table I, the upgrading of a highly malodorous alcohol contaminated with both recycle and hydrocarbon odors are set forth. In Table II data are given for the treatment of a less malodorous alcohol contaminated with both recycle and hydrocarbon odors, while in Table III the data are shown on the treatment of an alcohol highly contaminated with butyl odor.

Similar results were obtained of the treatment of ethanol by intimate contact with finely divided sands. These data are shown in Table IV.

The data in Table V demonstrates the effectiveness of the sands in improving the permanganate time of the alcohols treated.

Equally good results have also been obtained by aerating the sand bed during passage of the alcohol therethrough. This is accomplished by bubbling air, nitrogen or other inert, non-reactive gas through the sand bed simultaneously with the passage of the alcohol.

TABLE I

*Effect of sands on removing recycle odor from isopropanol*

| Packing | v./v./hr. | Quantity of alcohol, ml. | Alcohol before contact* | Alcohol after contact | Remarks |
|---|---|---|---|---|---|
| River sand | 3–18 | 2,100 | 4 rec. and HC | 3HC, no rec | Definite odor improvement. |
| Blasting sand | 6–12 | 1,200 | do | do | Do. |
| Ship island sand a | 6–18 | 1,500 | do | do | Do. |
| Ottawa sand | 12–18 | 600 | do | do | Do. |
| Pea gravel | 6–18 | 1,500 | do | do | Do. |
| Silica gel | 3–12 | 1,700 | do | 4 rec. and HC | No improvement. |
| Acid silicic ($SiO_2 \cdot XH_2O$) | 6 | 300 | do | do | Do. |
| Dicalite (diatomaceous silica) | 6 | 300 | do | do | Do. |
| Asbestos | 6–18 | 300 | do | | Quite sour odor; odor may be masked; no improvement. |

*Rec. = Recycle odor.
HC = Hydrocarbon odor.
a = Louisiana sharp particle sand.

TABLE II

*Effect of sands on removing recycle and hydrocarbon odor from isopropanol*

| Packing | v./v./hr. | Quantity of alcohol, ml. | Alcohol before contact* | Alcohol after contact | Remarks |
|---|---|---|---|---|---|
| River sand | 7–18 | 1,200 | 3 rec. and HC** | 2 HC, no rec | Definite odor improvement. |
| Blasting sand | 12–15 | 1,200 | do | do | Do. |
| Ship island sand a | 12–15 | 1,200 | do | do | Do. |
| Ottawa sand | 12–15 | 1,200 | do | do | Do. |
| Pea gravel | 6–18 | 1,800 | do | do | Do. |
| Silica gel | 3–18 | 1,200 | do | 3 rec. and HC | No improvement. |
| Acid silicic ($SiO_2 \cdot XH_2O$) | 6 | 300 | do | do | Do. |
| Dicalite (diatomaceous silica) | 6 | 300 | do | do | Do. |
| Asbestos | 6–18 | 300 | do | | Quite sour odor; no improvement. |

*Rec. = Recycle odor.
HC = Hydrocarbon odor.
a = Louisiana sharp particle sand.
** = Very mild with respect to recycle; would be grade 3HC without recycle present.

TABLE III

Effect of sands on removing butyl odor from isopropanol

| Packing | v./v./hr. | Quantity of alcohol, ml. | Alcohol before contact | Alcohol after contact | Remarks |
|---|---|---|---|---|---|
| River sand | 9–18 | 1,200 | 4 butyl | 3 butyl | Definite odor improvement. |
| Blasting sand | 6–18 | 1,200 | do | do | Do. |
| Ship island sand [a] | 9–18 | 1,200 | do | do | Do. |
| Ottawa sand | 9–18 | 1,200 | do | do | Do. |
| Pea gravel | 12–18 | 1,200 | do | do | Do. |
| Silica gel | 3–18 | 1,200 | do | 4 butyl | No improvement. |
| Acid silicic ($SiO_2 \cdot XH_2O$) | 6 | 300 | do | do | Do. |
| Dicalite (diatomaceous silica) | 6 | 300 | do | do | Do. |
| Asbestos | 6–18 | 300 | do | do | Sour odor; butyl odor strong; no improvement. |

[a] Louisiana sharp particle sand.

TABLE IV

Effect of sands on removing malodor from ethanol

| Packing | v./v./hr. | Quantity of alcohol, ml. | Alcohol before contact | Alcohol after contact |
|---|---|---|---|---|
| River sand | 3–18 | 1,500 | Recycle type odor; poor smelling. | No recycle odor; very good smelling; better than standard. |
| Blasting sand | 3–18 | 1,500 | do | Do. |
| Ship island sand | 3–18 | 1,500 | do | Do. |
| Ottawa sand | 3–18 | 1,500 | do | Do. |
| Pea gravel | 3–18 | 1,500 | do | Do. |
| Silica gel | 3–18 | 1,500 | do | No improvement. |
| Acid silicic ($SiO_2 \cdot XH_2O$) | 6–12 | 300 | do | Do. |
| Dicalite (diatomaceous silica) | 6–12 | 300 | do | Do. |
| Asbestos | 6–18 | 300 | do | Do. |

TABLE V

Effect of sands in improving the permanganate time of alcohols

| Alcohol | Contact agent | Before contact, odor | permanganate time (Min.) | After contact, odor | permanganate time (Min.) |
|---|---|---|---|---|---|
| Isopropyl alcohol | Blasting sand | 4 Butyl | 15 | 3 butyl | 90 |
| Do | do | 3HC | 15 | 2HC | 70 |
| Do | do | 4 Rec. and HC | 10 | 30HC—No rec | 60 |
| Do | do | 4 Acetate | 10 | 2 acetate | 90 |
| Ethyl alcohol | do | Recycle type odor, poor smelling. | 2 | No recycle | 90 |

What is claimed is:

1. A process for improving the odor characteristics of a water-soluble alcohol contaminated by high-boiling hydrocarbon and sulfur compounds which make the alcohol malodorous and which is prepared by hydration of a mono-olefin, which comprises intimately contacting the contaminated malodorous alcohol with sand in the absence of other purifying agents at a space velocity in the range of 0.5 to 50 volumes of the alcohol per volume of sand per hour, whereby the alcohol is rendered substantially less malodorous.

2. A process according to claim 1, in which a stream of the malodorous alcohol is passed in liquid phase into a bed of the sand for intimately contacting therewith, and in which the resulting alcohol rendered substantially less malodorous is passed through the bed of sand.

3. A process according to claim 1, in which the malodorous alcohol is in vapor phase when intimately contacted with the sand.

4. A process for improving the odor characteristics of a malodorous isopropanol contaminated by high-boiling hydrocarbon and sulfur compounds which are odoriferous and which is prepared by hydration of propylene, which comprises intimately contacting the malodorous isopropanol in the liquid phase with sand at a rate of flow of 0.5 to 50 volumes of the alcohol per volume of the sand per hour in the absence of other purifying agents, whereby the isopropanol is rendered substantially less malodorous, and withdrawing the isopropanol rendered substantially less malodorous from the sand.

5. A process according to claim 4, in which the sand is of 4 to 30 mesh particle size.

6. A process according to claim 4 in which a stream of the malodorous isopropanol in liquid phase is passed upwardly through a bed of the sand for intimately contacting the malodorous isopropanol with the sand.

7. A process for improving the odor characteristics of malodorous ethanol contaminated by high-boiling hydrocarbon and sulfur compounds which are malodorous and which is prepared by hydration of ethylene, which comprises intimately contacting the malodorous ethanol in the liquid phase with sand at a rate of flow of 0.5 to 50 volumes of the alcohol per volume of the sand per hour in the absence of other purifying agents, whereby the ethanol is rendered substantially less malodorous and withdrawing said enthanol substantially less malodorous from the sand.

8. A process according to claim 7 in which the sand is 4 to 30 mesh particle size.

9. A process according to claim 7 in which a stream of malodorous ethanol in the liquid phase is passed upwardly through a bed of the sand for intimately contacting the malodorous ethanol with the sand.

SAMUEL W. WILSON.
ELAINE T. DELAUNE.

References Cited in the file of this patent

UNITED STATES PATENTS

| Number | Name | Date |
|---|---|---|
| 56,863 | Prentiss et al. | July 31, 1866 |
| 159,450 | Reford | Feb. 2, 1875 |
| 161,642 | Spier | Apr. 6, 1875 |
| 1,162,212 | Bloom | Nov. 30, 1915 |
| 2,546,650 | Nijbaer | Mar. 27, 1951 |

FOREIGN PATENTS

| Number | Country | Date |
|---|---|---|
| 737 | Great Britain | of 1855 |